(12) United States Patent
Sasaki et al.

(10) Patent No.: US 9,932,812 B2
(45) Date of Patent: Apr. 3, 2018

(54) EXCAVATION STATUS MONITORING SYSTEM FOR TUNNELING MACHINE

(71) Applicant: HITACHI ZOSEN CORPORATION, Osaka-shi, Osaka (JP)

(72) Inventors: Katsuya Sasaki, Osaka (JP); Keitaro Hidani, Osaka (JP); Kohei Takatori, Osaka (JP); Takuya Miwa, Osaka (JP)

(73) Assignee: HITACHI ZOSEN CORPORATION, Osaka-shi (JP)

( * ) Notice: Subject to any disclaimer, the term of this patent is extended or adjusted under 35 U.S.C. 154(b) by 23 days.

(21) Appl. No.: 14/649,715

(22) PCT Filed: Nov. 12, 2013

(86) PCT No.: PCT/JP2013/080530
§ 371 (c)(1),
(2) Date: Jun. 4, 2015

(87) PCT Pub. No.: WO2014/103542
PCT Pub. Date: Jul. 3, 2014

(65) Prior Publication Data
US 2015/0300152 A1    Oct. 22, 2015

(30) Foreign Application Priority Data

Dec. 27, 2012  (JP) .................. 2012-285471

(51) Int. Cl.
*E21B 44/00* (2006.01)
*E21B 45/00* (2006.01)
(Continued)

(52) U.S. Cl.
CPC .............. *E21B 45/00* (2013.01); *E21B 47/09* (2013.01); *E21D 9/06* (2013.01); *E21D 9/093* (2016.01);
(Continued)

(58) Field of Classification Search
CPC ...................................................... E21B 45/00
(Continued)

(56) References Cited

U.S. PATENT DOCUMENTS 4,542,504 A * 9/1985 Moul .................... H04J 3/0685
370/517
4,777,785 A * 10/1988 Rafaels ................ A01D 34/008
56/10.2 A
(Continued)

FOREIGN PATENT DOCUMENTS

DE    3819818 A1    12/1989
JP    55-46274    3/1980
(Continued)

OTHER PUBLICATIONS

Office Action dated Apr. 5, 2016, issued in counterpart Japanese Patent Application No. 2012-285471, with English translation. (8 pages).
(Continued)

*Primary Examiner* — Hezron E Williams
*Assistant Examiner* — Tarun Sinha
(74) *Attorney, Agent, or Firm* — Westerman, Hattori, Daniels & Adrian, LLP

(57) ABSTRACT

An excavation status monitoring system for a tunneling machine that includes a detecting portion mounted on a cutter head of the tunneling machine, including an accelerometer that detects a vibration or an acoustic sensor that detects a sound wave and a sound output portion that outputs a signal detected by the detecting portion as sound.

6 Claims, 3 Drawing Sheets

(51) Int. Cl.
*E21D 9/06* (2006.01)
*E21B 47/09* (2012.01)
*G01H 17/00* (2006.01)
*G01M 99/00* (2011.01)
*G01H 1/00* (2006.01)
*G01H 3/00* (2006.01)
*E21D 9/093* (2006.01)

(52) U.S. Cl.
CPC ................. *G01H 1/00* (2013.01); *G01H 3/00* (2013.01); *G01H 17/00* (2013.01); *G01M 99/005* (2013.01)

(58) Field of Classification Search
USPC ........................................ 73/152.47; 405/138
See application file for complete search history.

(56) References Cited

U.S. PATENT DOCUMENTS

| | | | | |
|---|---|---|---|---|
| 5,330,292 | A | * | 7/1994 | Sakanishi ............... E21D 9/093 299/1.05 |
| 2009/0297273 | A1 | * | 12/2009 | Lindbergh .............. E21D 9/003 405/138 |
| 2010/0189580 | A1 | * | 7/2010 | Kyllingstad ............ F04B 51/00 417/437 |
| 2013/0082846 | A1 | * | 4/2013 | McKinley ................ G07C 3/08 340/870.01 |

FOREIGN PATENT DOCUMENTS

| | | | |
|---|---|---|---|
| JP | 5-10090 | A | 1/1993 |
| JP | 09-178851 | A | 7/1997 |
| JP | 11-303572 | A | 11/1999 |
| JP | 2002-81289 | A | 3/2002 |
| JP | 3275085 | B2 | 4/2002 |
| JP | 3338532 | B2 | 10/2002 |
| JP | 2004-27702 | A | 1/2004 |
| JP | 2004027702 | A * | 1/2004 |

OTHER PUBLICATIONS

International Search Report dated Dec. 17, 2013 issued in corresponding application No. PCT/JP2013/080530 (2 pages).
Office Action dated Mar. 3, 2016, issued in counterpart Chinese Patent Application No. 2013800684993, with English translation. (16 pages).
Written Opinion dated Jan. 5, 2016, issued in counterpart Singapore Patent Application No. 11201504984X. (11 pages).

* cited by examiner

EXCAVATION STATUS MONITORING SYSTEM FOR TUNNELING MACHINE

TECHNICAL FIELD

The present invention relates to an excavation status monitoring system for a tunneling machine, and more particularly, it relates to an excavation status monitoring system for a tunneling machine that detects a vibration or a sound wave.

BACKGROUND ART

In general, an excavation status monitoring system for a tunneling machine that detects a sound wave is known. Such an excavation status monitoring system for a tunneling machine is disclosed in Japanese Patent No. 3275085, for example.

In Japanese Patent No. 3275085, there is disclosed an excavation status monitoring system for a tunneling machine including an acoustic wave sensor mounted on a bulkhead of a rear portion of a closed chamber on the rear side of a cutter head (cutter face) and a speaker that outputs sound on the basis of a sound wave (signal) detected by the acoustic wave sensor. In this excavation status monitoring system for a tunneling machine, the acoustic wave sensor mounted on the bulkhead of the rear portion of the closed chamber on the back of the cutter head detects sound of ground excavation by the cutter head and outputs the detection signal as sound by the speaker, whereby an operator can perceive an excavation status aurally.

PRIOR ART

Patent Document

Patent Document 1: Japanese Patent No. 3275085

SUMMARY OF THE INVENTION

Problem to be Solved by the Invention

In the excavation status monitoring system for a tunneling machine according to Japanese Patent No. 3275085, however, the acoustic wave sensor is arranged at a position (bulkhead) through the closed chamber behind the cutter head, and hence there is such a disadvantage that the sound (sound wave signal) of ground excavation by the cutter head is attenuated before reaching the acoustic wave sensor. Thus, in the excavation status monitoring system for a tunneling machine according to Japanese Patent No. 3275085, it is difficult to accurately detect the sound wave signal when the cutter head contacts with an obstacle such as gravel. Consequently, there is such a problem that it is difficult for the operator to accurately perceive an excavation status (the presence or absence of an obstacle such as gravel) aurally when sound is output on the basis of the sound of ground excavation by the cutter head.

The present invention has been proposed in order to solve the aforementioned problem, and an object of the present invention is to provide an excavation status monitoring system for a tunneling machine that allows an operator to accurately perceive an excavation status (the presence or absence of an obstacle such as gravel) aurally.

Means for Solving the Problem

In order to attain the aforementioned object, an excavation status monitoring system for a tunneling machine according to an aspect of the present invention includes a detecting portion mounted on a cutter head of the tunneling machine, including an accelerometer that detects a vibration or an acoustic sensor that detects a sound wave and a sound output portion that outputs a signal detected by the detecting portion as sound.

In the excavation status monitoring system for a tunneling machine according to the aspect of the present invention, as hereinabove described, the detecting portion including the accelerometer that detects a vibration or the acoustic sensor that detects a sound wave is mounted on the cutter head of the tunneling machine, whereby unlike the case where the detecting portion is mounted on a bulkhead of a rear portion of a closed chamber on the rear side of the cutter head, the detecting portion can be arranged close to (in the vicinity of) the front surface of the cutter head that contacts with a face, and hence the detection signal such as sound or a vibration during excavation of ground by the cutter head can be suppressed from being attenuated and reduced (weakened) before reaching the detecting portion. Thus, the sound or vibration during excavation of ground by the cutter head can be accurately detected by the detecting portion, and hence the sound output portion outputs sound on the basis of the sound or vibration during excavation of ground by the cutter head when the cutter head contacts with an obstacle such as gravel, whereby an operator can accurately perceive an excavation status (the presence or absence of an obstacle such as gravel) aurally. Consequently, the operator can more promptly and accurately perceive an excavation status (the presence or absence of an obstacle such as gravel) aurally when the cutter head contacts with an obstacle such as gravel, and hence the operating conditions can be more promptly adjusted before the cutter head (a cutter bit or the like) is damaged. Furthermore, the detecting portion is mounted on the cutter head that is a rotating body, whereby unlike the case where the detecting portion is mounted on the bulkhead (stationary body) of the rear portion of the closed chamber on the rear side of the cutter head, the position of the detecting portion with respect to the face is changed (rotationally moved) following the rotation of the cutter head, and hence the position of an obstacle such as gravel in the face can be perceived on the basis of the mounting position of the detecting portion and the rotation angle of the cutter head.

Preferably in the aforementioned excavation status monitoring system for a tunneling machine according to the aspect, the detecting portion includes a first detecting portion for real-time diagnosis, and a signal detected by the first detecting portion is transmitted to the sound output portion and is output as sound in real time. According to this structure, by the real-time sound output based on the signal detected by the first detecting portion for real-time diagnosis, the operator can more promptly perceive an excavation status (the presence or absence of an obstacle such as gravel) and more promptly deal with an obstacle.

Preferably in the aforementioned excavation status monitoring system for a tunneling machine according to the aspect, a plurality of detecting portions are arranged at different radial positions of the cutter head. According to this structure, the position and size of an obstacle such as gravel in the face can be accurately perceived on the basis of the mounting positions of the plurality of detecting portions and the rotation angle of the cutter head. Furthermore, the plurality of detecting portions are arranged at the different radial positions of the cutter head, whereby unlike the case where the presence or absence of an obstacle is detected on the basis of a value of the cutter torque or a value of the thrust of the tunneling machine, the plurality of detecting portions arranged at the different radial positions can easily detect an obstacle even when the obstacle locally exists only in a portion of the face and the overall torque or thrust is hardly influenced.

Preferably in this case, the plurality of detecting portions arranged at the different radial positions of the cutter head are arranged at different rotation angle positions of the cutter head. According to this structure, the plurality of detecting portions can be arranged at the rotation angle positions separated from each other, and hence a detecting portion of the plurality of detecting portions close to the position of an obstacle such as gravel can be easily identified. Consequently, the position and size of an obstacle such as gravel in the face can be more accurately perceived on the basis of the mounting position (rotation angle position) of the identified detecting portion and the rotation angle of the cutter head. Furthermore, the plurality of detecting portions are arranged at the different rotation angle positions of the cutter head, whereby a detecting portion can be more quickly moved close to the position of a local obstacle as compared with the case where the plurality of detecting portions are arranged at the same rotation angle position, and hence a local obstacle can be more promptly detected.

Preferably, the aforementioned excavation status monitoring system for a tunneling machine according to the aspect further includes a data recording portion that is arranged in the cutter head, is capable of performing prescribed internal network communication, and records signals detected by a plurality of detecting portions and an internal information terminal device that is arranged in a portion of the tunneling machine behind the cutter head and receives the signals detected by the plurality of detecting portions and transmitted through the internal network communication from the data recording portion, and the signals detected by the detecting portions are output as sound from the sound output portion through the internal information terminal device. According to this structure, the signals detected by the plurality of detecting portions can be unified by the data recording portion arranged in the cutter head, and hence the signals detected by the plurality of detecting portions can be easily transmitted from the cutter head to the internal information terminal device arranged in the portion behind the cutter head and output as sound. Furthermore, by development of recent computer technology (data acquisition and data transfer technology), data can be transferred to the internal information terminal device through the data recording portion also at a sampling rate (data acquisition frequency) of at least 10 kHz required to measure excavation vibration data or the like, and hence sound can be output in near-real time even through the data recording portion and the internal information terminal device. Thus, the operator can promptly perceive an excavation status (the presence or absence of an obstacle such as gravel) even through the data recording portion and the internal information terminal device.

Preferably in this case, the cutter head in which the detecting portions and the data recording portion are arranged is rotary, the signals recorded in the data recording portion arranged in the cutter head that is rotary are transmitted through a signal transmission member that transmits a signal from a rotating body to a stationary body when transmitted to the internal information terminal device arranged in a non-rotating portion of the tunneling machine behind the cutter head through the internal network communication, and the signals that are electrical through the internal network communication are converted to optical signals and are transmitted toward the internal information terminal device. According to this structure, even in the case where the detecting portions and the data recording portion are arranged in the rotary cutter head, the signals detected by the plurality of detecting portions can be easily transmitted from the cutter head that is a rotating body to the internal information terminal device on the rear side that is a stationary body through the signal transmission member in the state where the signals are unified by the data recording portion. Furthermore, the signals detected by the plurality of detecting portions can be transmitted from the cutter head that is a rotating body to the internal information terminal device on the rear side that is a stationary body in the state where the signals are unified by the data recording portion, and hence it is not necessary to provide the signal transmission member that transmits a signal from a rotating body to a stationary body in each detecting portion. Consequently, an increase in the number of signal transmission members can be suppressed even in the case where the plurality of detecting portions are mounted on the cutter head. In addition, the electrical signals through the internal network communication are converted to the optical signals and are transmitted toward the internal information terminal device, whereby the signals detected by the plurality of detecting portions can be transmitted toward the internal information terminal device in a state where the signals are converted to the optical signals not having a susceptibility to noise caused by a motor or the like that rotates the cutter head, and hence sound can be output more clearly. Thus, the operator can accurately perceive an excavation status (the presence or absence of an obstacle such as gravel).

Preferably, the aforementioned structure including the data recording portion and the internal information terminal device further includes an external information terminal device that is arranged outside the tunneling machine and receives the signals transmitted through external network communication by the internal information terminal device. According to this structure, the signals detected by the plurality of detecting portions mounted on the cutter head can be received by the external information terminal device in an office or the like in a remote location away from a tunnel excavation site in addition to the excavation site. Thus, in the remote location, a more detailed analysis and a more detailed study of an excavation status that are difficult in the excavation site can be carried out on the basis of the signals received by the external information terminal device.

Preferably in the aforementioned structure including the data recording portion and the internal information terminal device, the detecting portions include a second detecting portion for post-event diagnosis, and a signal detected by the second detecting portion is transmitted to the sound output portion through the internal information terminal device and is output as sound after being recorded in the data recording portion, and is capable of being diagnosed after the event on the basis of the signal detected by the second detecting portion and accumulated in the internal information terminal device. According to this structure, a detailed analysis and a detailed study of an excavation status can be carried out after the event, using the signal detected by the second detecting portion for post-event diagnosis and recorded in the data recording portion. Furthermore, as described above, by development of recent data acquisition and data transfer technology, sound can be output in near-real time even through the data recording portion and the internal information terminal device, and hence the operator can promptly perceive an excavation status also using the signal detected by the second detecting portion for post-event diagnosis.

Effect of the Invention

According to the present invention, as hereinabove described, the operator can accurately perceive an excavation status (the presence or absence of an obstacle such as gravel) aurally.

MODES FOR CARRYING OUT THE INVENTION

An embodiment of the present invention is hereinafter described on the basis of the drawings.

Figure 1:
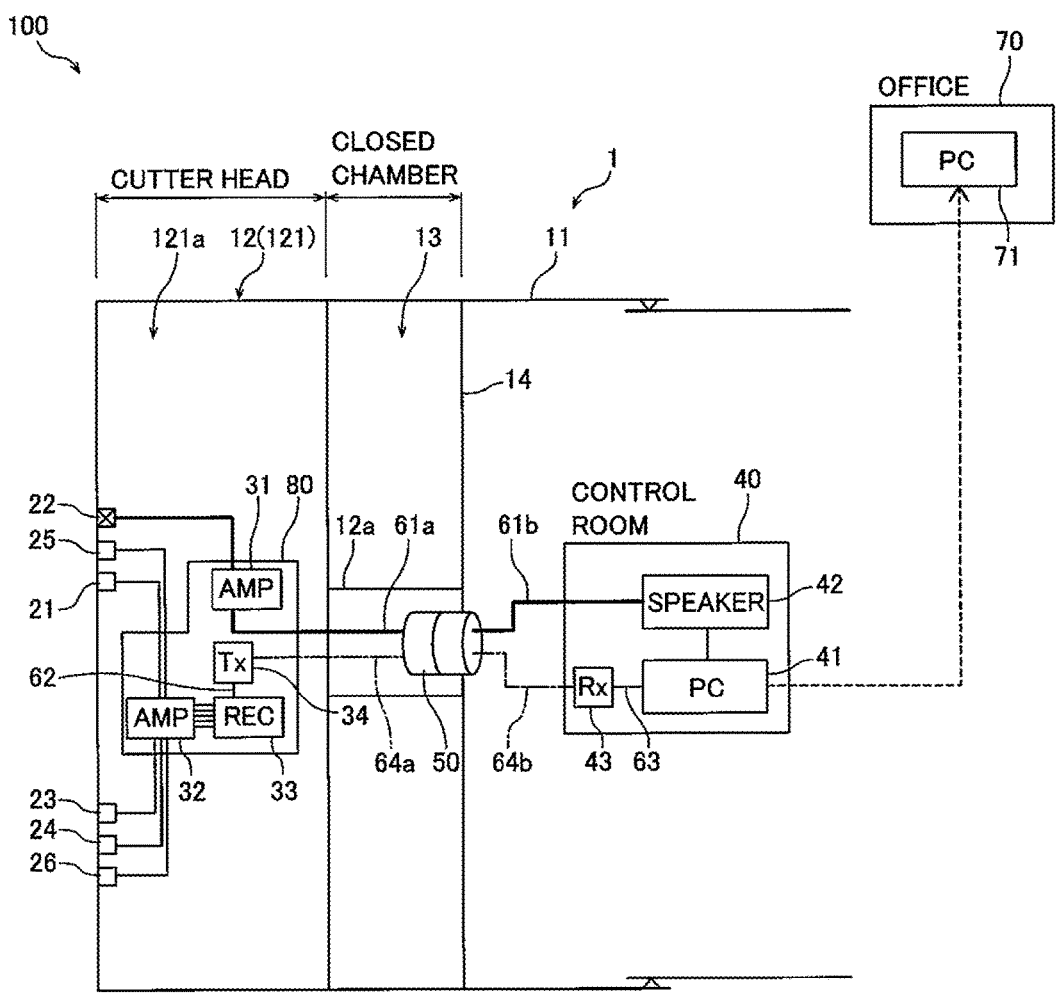
FIG. 1 A schematic view showing the overall structure of an excavation status monitoring system for a tunneling machine according to an embodiment of the present invention.

The structure of an excavation status monitoring system 100 for a tunneling machine according to the embodiment of the present invention is now described with reference to FIGS. 1 to 3.

The excavation status monitoring system 100 for a tunneling machine is a system configured to detect an underground obstacle (obstacle) such as gravel when a tunneling machine 1 excavates a tunnel. The tunneling machine 1 is a shield tunneling machine having a large diameter (about 10 m in diameter) and corresponds to a closed type shield tunneling method. Specifically, the tunneling machine 1 includes a cylindrical shield frame 11, a cutter head 12 of a face plate type arranged on a front end of the shield frame 11 in an excavation direction, a closed chamber 13 located on the rear side of the cutter head 12, a bulkhead 14 of a rear portion of the closed chamber 13, and a screw conveyor 15 that continuously discharges excavated soil in the closed chamber 13, as shown in FIG. 2. The tunneling machine 1 is configured to excavate while assembling unshown segments in a ring shape (segment ring) by an erector device 16 arranged on the rear side in the machine.

Figure 2:
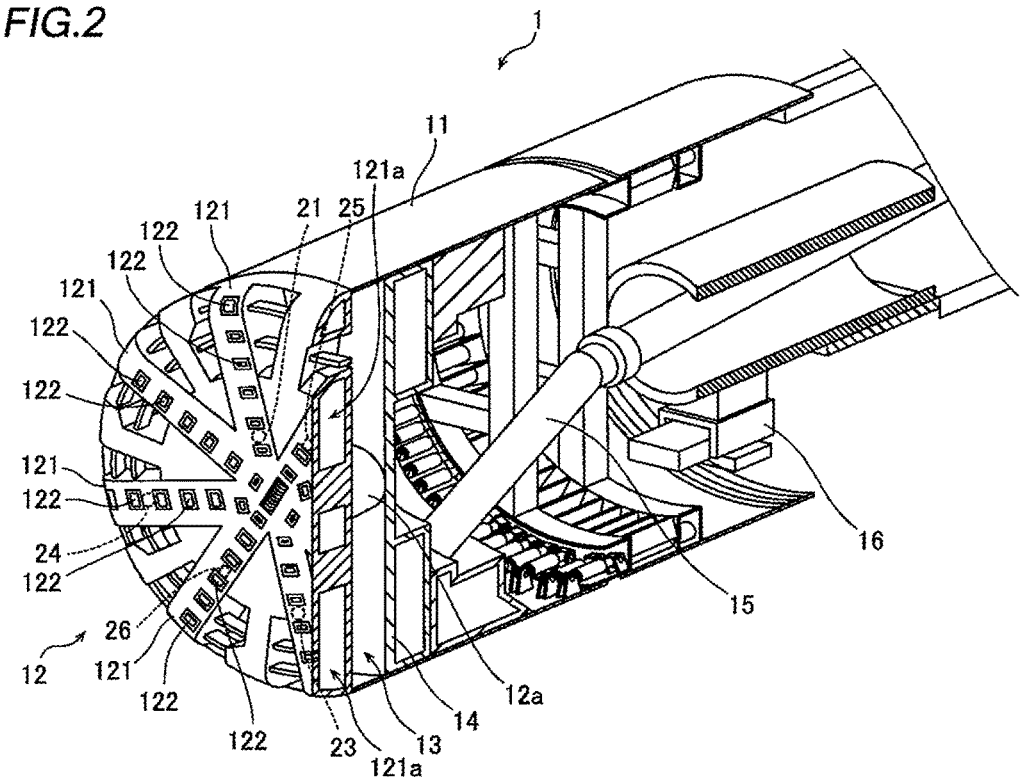
FIG. 2 A schematic perspective view showing the internal structure of a tunneling machine to which the excavation status monitoring system for a tunneling machine according to the embodiment of the present invention is applied.

As shown in FIG. 2, the cutter head 12 is circularly formed as viewed in the excavation direction and is configured to be circumferentially rotated together with a rotating shaft portion 12a arranged in the closed chamber 13 by an unshown motor. The shield frame 11 and the bulkhead 14 are stationary bodies that are not rotated. The cutter head 12 includes eight cutter spokes 121 that radially extend and are arranged at equal angular intervals of 45 degrees, as shown in FIGS. 2 and 3. The eight cutter spokes 121 each are mounted with a plurality of disc cutters (cutter bits) 122 arranged at substantially equal intervals in a radial direction. The eight cutter spokes 121 each have a hollow portion 121a, as shown in FIG. 2.

Figure 3:
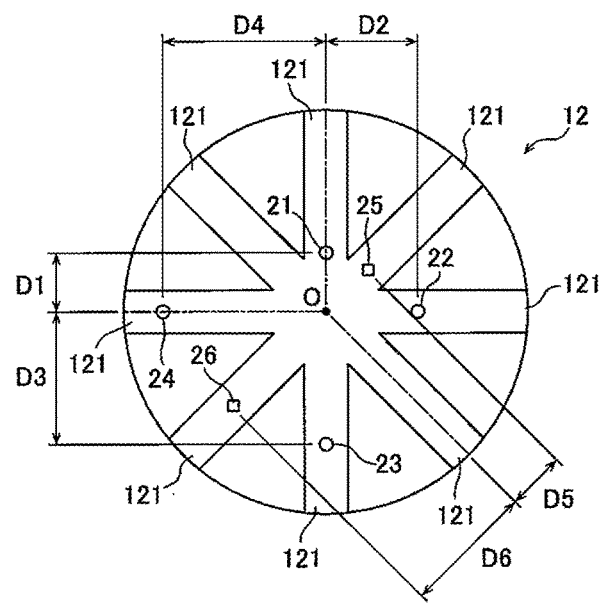
FIG. 3 A diagram showing the arrangement of accelerometers in the excavation status monitoring system for a tunneling machine according to the embodiment of the present invention.

According to this embodiment, the cutter head 12 that is a rotating body is mounted with six accelerometers 21 to 26 that detect vibrations, as shown in FIG. 3. More specifically, the six accelerometers 21 to 26 are rotated together with the cutter head 12 following the rotation of the cutter head 12. The six accelerometers 21 to 26 are mounted on the cutter spokes 121 different from each other so as to be arranged at different rotation angle positions of the cutter head 12. Specifically, as viewed from the front side, the accelerometer 22 is arranged at a position deviated by 90 degrees in a clockwise direction with respect to the accelerometer 21, and the accelerometer 23 is arranged at a position deviated by 90 degrees in the clockwise direction with respect to the accelerometer 22 (a position of 180 degrees in the clockwise direction from the accelerometer 21). Furthermore, the accelerometer 24 is arranged at a position deviated by 90 degrees in the clockwise direction with respect to the accelerometer 23 (a position of 270 degrees in the clockwise direction from the accelerometer 21). More specifically, the accelerometers 21 to 24 are arranged at equal angular intervals of 90 degrees. Moreover, the accelerometer 25 is arranged at a position deviated by 45 degrees in the clockwise direction with respect to the accelerometer 21, and the accelerometer 26 is arranged at a position deviated by 180 degrees in the clockwise direction with respect to the accelerometer 25 (a position of 225 degrees in the clockwise direction from the accelerometer 21).

The accelerometers 21 to 26 each are arranged in the hollow portion 121a of a corresponding cutter spoke 121 and are mounted on the inner surface of the cutter spoke 121 in a state where the same do not contact with mud. The accelerometers 21 to 24 arranged at equal angular intervals of 90 degrees are arranged at different radial positions of the cutter head 12 so as to be evenly distributed (distributed at equal intervals) to an entire area of the cutter head 12 in the radial direction. Specifically, the accelerometer 21, the accelerometer 22, the accelerometer 23, and the accelerometer 24 are arranged at positions separated by a distance D1 (2 m, for example), a distance D2 (4 m, for example), a distance D3 (6 m, for example), and a distance D4 (8 m, for example), respectively, in the radial direction from the center of the cutter head 12. The accelerometers 25 and 26 are arranged at positions separated by a distance D5 (2 m, for example) and a distance D6 (6 m, for example), respectively, in the radial direction from the center of the cutter head 12.

The accelerometer 22 is a detecting portion for real-time diagnosis and is connected to a speaker 42 of a control room 40 without involving a recorder 33 described later and a PC (personal computer) 41 of the control room 40. Specifically, the accelerometer 22 is connected to the speaker 42 through an amplifier 31 that is arranged in the cutter head 12 and amplifies a detection signal (analog signal) and a slip ring 50 that transmits a signal from a rotating body to a stationary body. Thus, a vibration (signal) detected by the accelerometer 22 is directly transmitted to the speaker 42 as an analog signal without involving the recorder 33 and the PC 41 and is output as impulsive sound in real time. The vibration (signal) detected by the accelerometer 22 is transmitted to the speaker 42 through BNC cables (coaxial cables) 61a and 61b. The accelerometer 22 is arranged at a position between the accelerometer 21 located innermost (on a rotation center side) and the accelerometer 24 located outermost (on an outer peripheral side) of the accelerometers 21 to 24 arranged at the different radial positions, and hence the accelerometer 22 easily accurately detects a vibration (signal) generated by contact with the obstacle even if the obstacle such as gravel contacts with any position of the cutter head 12. The accelerometer 22 is an example of the "detecting portion" or the "first detecting portion" in the present invention, and the speaker 42 is an example of the "sound output portion" in the present invention.

The remaining five accelerometers (accelerometers 21 and 23 to 26) excluding the accelerometer 22 of the six accelerometers 21 to 26 are connected to the recorder 33 arranged in the cutter head 12 that is a rotating body. More specifically, the accelerometers 21 and 23 to 26 are connected to the recorder 33 through an amplifier 32 that amplifies analog signals detected by the accelerometers 21 and 23 to 26. The accelerometers 21 and 23 to 26 are examples of the "detecting portion" or the "second detecting portion" in the present invention, and the recorder 33 is an example of the "data recording portion" in the present invention.

The recorder 33 converts vibrations (signals) detected by the accelerometers 21 and 23 to 26 from analog signals to digital signals to record the signals and has a function of transmitting the digital signals to the PC 41 described later. More specifically, the recorder 33 acquires vibration (signal) data from the accelerometers 21 and 23 to 26 at a sampling rate of at least 5 kHz and preferably at least 10 kHz and performs digital conversion, and can transmit the signals detected by the accelerometers 21 and 23 to 26 to the PC 41 through LAN (local area network) communication in a state where the signals (digital signals) are unified. By development of recent computer technology (data acquisition and data transfer (transmission) technology), data can be transferred to the PC 41 through the recorder 33 also at the sampling rate of at least 10 kHz required to measure the aforementioned excavation vibration data, and the data acquired from the accelerometers 21 and 23 to 26 can be transferred to the PC 41 in an almost real-time way and be output as sound from the speaker 42. In the cutter head 12, a light conversion transmission portion 34 that converts electrical digital signals obtained by conversion by the recorder 33 to optical digital signals and transmits the signals is arranged. The recorder 33 and the light conversion transmission portion 34 are connected to each other by a LAN cable 62.

A non-rotating portion (a working area in the machine) of the tunneling machine 1 behind the cutter head 12 and behind the bulkhead 14 of the closed chamber 13 is provided with the control room 40, and in the control room 40, the PC 41 that receives signals recorded in the recorder 33 is arranged. The PC 41 can perform LAN communication and is connected to the light reception conversion portion 43 by a LAN cable 63. The PC 41 is an example of the "internal information terminal device" in the present invention.

More specifically, the recorder 33 and the PC 41 are connected to each other through the light conversion transmission portion 34 arranged in the cutter head 12, the slip ring 50 that transmits a signal from a rotating body to a stationary body, and the light reception conversion portion 43 arranged in the control room 40. Thus, in the excavation status monitoring system 100 for a tunneling machine according to this embodiment, the signals recorded in the recorder 33 arranged in the rotary cutter head 12 (rotating body) can be transmitted to the PC 41 (stationary body) arranged in the non-rotating portion behind the cutter head 12 through LAN communication. As to the signals transmitted from the recorder 33 to the PC 41, LAN signals of the LAN cable 62 are transmitted to the light reception conversion portion 43 close to the PC 41 through optical fibers 64a and 64b in state where the same are converted to optical digital signals by the light conversion transmission portion 34, and thereafter the optical signals are converted to electrical signals by the light reception conversion portion 43 and are transmitted to the PC 41 through the LAN cable 63.

The slip ring 50 is an example of the "signal transmission member" in the present invention.

The PC 41 is connected with the speaker 42 that outputs the vibrations (signals) detected by the accelerometers 21 and 23 to 26 as impulsive sound. The PC 41 is configured to be capable of outputting a received signal as sound from the speaker 42. More specifically, after being recorded by the recorder 33, the vibrations (signals) detected by the accelerometers 21 and 23 to 26 are transmitted to the speaker 42 through the PC 41 and are output as sound. Furthermore, the signals detected by the accelerometers 21 and 23 to 26 can be diagnosed after the event on the basis of signals detected by the accelerometers 21 and 23 to 26 and accumulated in the PC 41. More specifically, the accelerometers 21 and 23 to 26 are employed as detecting portions for post-event diagnosis.

The PC 41 is configured to be capable of performing Internet communication and is connected to a PC 71 arranged outside the tunneling machine 1 through Internet communication. The PC 71 is provided in an office 70 in a remote location (on the ground) away from a tunnel excavation site. The PC 71 is configured to be capable of receiving signals detected by the accelerometers 21 and 23 to 26 and transmitted by the PC 41 through Internet communication and diagnosing the signals after the event. The PC 71 is an example of the "external information terminal device" in the present invention.

The amplifiers 31 and 32, the recorder 33, and the light conversion transmission portion 34 arranged in the cutter head 12 are housed in a housing 80 having a water-resistant function and an earthquake-resistant function.

According to this embodiment, as hereinabove described, the accelerometers 21 to 26 that detect vibrations are mounted on the cutter head 12 of the tunneling machine 1, whereby unlike the case where the accelerometers 21 to 26 are mounted on the bulkhead 14 of the rear portion of the closed chamber 13 on the rear side of the cutter head 12, the accelerometers 21 to 26 can be arranged close to (in the vicinity of) the front surface of the cutter head 12 that contacts with a face, and hence vibrations (detection signals) during excavation of ground by the cutter head 12 can be suppressed from being attenuated and reduced (weakened) before reaching the accelerometers 21 to 26. Thus, the vibrations during excavation of ground by the cutter head 12 can be accurately detected by the accelerometers 21 to 26, and hence the speaker 42 outputs sound on the basis of the vibrations during excavation of ground by the cutter head 12 when the cutter head 12 contacts with an obstacle such as gravel, whereby an operator can accurately perceive an excavation status (the presence or absence of an obstacle such as gravel) aurally. Furthermore, as described above, by development of recent computer technology (data acquisition and data transfer technology), sound can be output in near-real time even through the recorder 33 and the PC 41, and hence the operator can more promptly and accurately perceive an excavation status (the presence or absence of an obstacle such as gravel) aurally when the cutter head 12 contacts with an obstacle such as gravel even on the basis of the signals detected by not only the accelerometer 22 for real-time diagnosis but also the accelerometers 21 and 23 to 26 for post-event diagnosis. Consequently, the operating conditions can be more promptly adjusted before the disc cutters (cutter bits) 122 are damaged. Furthermore, the accelerometers 21 to 26 are mounted on the cutter head 12 that is a rotating body, whereby unlike the case where the accelerometers 21 to 26 are mounted on the bulkhead 14 (stationary body) of the rear portion of the closed chamber 13 on the rear side of the cutter head 12, the positions of the accelerometers 21 to 26 with respect to the face are changed (rotationally moved) following the rotation of the cutter head 12, and hence the position of an obstacle such as gravel in the face can be perceived on the basis of the mounting positions of the accelerometers 21 to 26 and the rotation angle of the cutter head 12.

According to this embodiment, as hereinabove described, the accelerometer 22 for real-time diagnosis is provided, and the signal detected by the accelerometer 22 is transmitted to the speaker 42 and is output as sound in real time. Thus, by the real-time sound output based on the signal detected by the accelerometer 22 for real-time diagnosis, the operator can more promptly perceive an excavation status (the presence or absence of an obstacle such as gravel) and more promptly deal with an obstacle.

According to this embodiment, as hereinabove described, the accelerometers 21 to 24 are arranged at the different radial positions of the cutter head 12. Thus, the position and size of an obstacle such as gravel in the face can be accurately perceived on the basis of the mounting positions of the accelerometers 21 to 24 and the rotation angle of the cutter head 12. Furthermore, the accelerometers 21 to 24 are arranged at the different radial positions of the cutter head 12, whereby unlike the case where the presence or absence of an obstacle is detected on the basis of a value of the cutter torque or a value of the thrust of the tunneling machine 1, the accelerometers 21 to 24 arranged at the different radial positions can easily detect an obstacle even when the obstacle locally exists only in a portion of the face and the overall torque or thrust is hardly influenced. Particularly according to this embodiment, the accelerometers 21 to 24 are arranged at the different radial positions at equal intervals of 2 m, and hence this advantageous effect is large.

According to this embodiment, as hereinabove described, the accelerometers 21 to 26 are arranged at the different rotation angle positions of the cutter head 12. Thus, the accelerometers 21 to 26 can be arranged at the rotation angle positions separated from each other, and hence an accelerometer of the accelerometers 21 to 26 close to the position of an obstacle such as gravel can be easily identified. Consequently, the position and size of an obstacle such as gravel in the face can be more accurately perceived on the basis of the mounting position (rotation angle position) of the identified accelerometer and the rotation angle of the cutter head 12. Furthermore, the accelerometers 21 to 26 are arranged at the different rotation angle positions of the cutter head 12, whereby an accelerometer can be more quickly moved close to the position of a local obstacle as compared with the case where a plurality of accelerometers are arranged at the same rotation angle position, and hence a local obstacle can be more promptly detected.

According to this embodiment, as hereinabove described, the recorder 33 that is capable of performing LAN communication and records the signals detected by the accelerometers 21 and 23 to 26 is provided in the cutter head 12, and the PC 41 that receives the signals detected by the accelerometers 21 and 23 to 26 and transmitted through LAN communication from the recorder 33 is provided in the portion of the tunneling machine 1 behind the cutter head 12. Furthermore, the signals detected by the accelerometers 21 and 23 to 26 are output as sound from the speaker 42 through the PC 41. Thus, the signals detected by the accelerometers 21 and 23 to 26 can be unified by the recorder 33 arranged in the cutter head 12, and hence the signals detected by the accelerometers 21 and 23 to 26 can be easily transmitted from the cutter head 12 to the PC 41 arranged in the portion behind the cutter head 12 and output as sound. Furthermore, as described above, by development of recent computer technology (data acquisition and data transfer technology), sound can be output in near-real time even through the recorder 33 and the PC 41, and hence the operator can promptly perceive an excavation status (the presence or absence of an obstacle such as gravel) on the basis of the signals detected by the accelerometers 21 and 23 to 26.

According to this embodiment, as hereinabove described, the signals recorded in the recorder 33 arranged in the rotary cutter head 12 are transmitted through the slip ring 50 that transmits a signal from a rotating body to a stationary body when transmitted to the PC 41 arranged in the non-rotating portion of the tunneling machine 1 behind the cutter head 12 through LAN communication. Thus, even in the case where the accelerometers 21 and 23 to 26 and the recorder 33 are arranged in the rotary cutter head 12, the signals detected by the accelerometers 21 and 23 to 26 can be easily transmitted from the cutter head 12 that is a rotating body to the PC 41 on the rear side that is a stationary body through the slip ring 50 in the state where the signals are unified by the recorder 33. Furthermore, the signals detected by the accelerometers 21 and 23 to 26 can be transmitted from the cutter head 12 that is a rotating body to the PC 41 on the rear side that is a stationary body in the state where the signals are unified by the recorder 33, and hence it is not necessary to provide the slip ring 50 that transmits a signal from a rotating body to a stationary body in each accelerometer. Consequently, an increase in the number of slip rings 50 can be suppressed even in the case where a plurality of accelerometers are mounted on the cutter head 12.

In addition, the light conversion transmission portion 34 converts the electrical signals through LAN communication to the optical digital signals and transmits the signals toward the PC 41, whereby the signals detected by the accelerometers 21 and 23 to 26 can be transmitted toward the PC 41 in a state where the signals are converted to the optical digital signals not having a susceptibility to noise caused by a motor or the like that rotates the cutter head 12, and hence sound can be output more clearly. Thus, the operator can accurately perceive an excavation status (the presence or absence of an obstacle such as gravel). This structure is particularly effective in the case where the detection signals are required to pass through a portion behind the bulkhead 14, in which a relatively large number of electromagnetic waves exist.

According to this embodiment, as hereinabove described, the PC 71 that receives a signal transmitted through Internet communication by the PC 41 inside the tunneling machine 1 is arranged outside the tunneling machine 1. Thus, the signals detected by the accelerometers 21 and 23 to 26 mounted on the cutter head 12 can be received by the PC 71 in the office 70 in the remote location away from the tunnel excavation site in addition to the excavation site. Thus, in the remote location, a more detailed analysis and a more detailed study of an excavation status that are difficult in the excavation site can be carried out on the basis of the signals received by the PC 71.

According to this embodiment, as hereinabove described, the signals detected by the accelerometers 21 and 23 to 26 for post-event diagnosis are transmitted to the speaker 42 through the PC 41 and are output as sound after being recorded in the recorder 33, and are capable of being diagnosed after the event on the basis of the signals detected by the accelerometers 21 and 23 to 26 and accumulated in the PC 41. Thus, a detailed analysis and a detailed study of an excavation status can be carried out after the event, using the signals detected by the accelerometers 21 and 23 to 26 for post-event diagnosis and recorded in the recorder 33.

The embodiment disclosed this time must be considered as illustrative in all points and not restrictive. The range of the present invention is shown not by the above description of the embodiment but by the scope of claims for patent, and all modifications within the meaning and range equivalent to the scope of claims for patent are further included.

For example, while the example of applying the excavation status monitoring system for a tunneling machine according to the present invention to the shield tunneling machine has been shown in the aforementioned embodiment, the present invention is not restricted to this. The excavation status monitoring system for a tunneling machine according to the present invention may be applied to a tunneling machine other than the shield tunneling machine, such as a TBM (tunnel boring machine).

While the cutter head of a face plate type has been shown as an example of the cutter head according to the present invention in the aforementioned embodiment, the present invention is not restricted to this. According to the present invention, a cutter head other than the cutter head of a face plate type, such as a cutter head of a roller type may be employed.

While the example of providing the eight cutter spokes in the cutter head has been shown in the aforementioned embodiment, the present invention is not restricted to this. According to the present invention, cutter spokes of the number other than eight may be provided in the cutter head.

While the example of arranging the accelerometers as the detecting portions according to the present invention and the recorder as the data recording portion according to the present invention in the cutter spokes of the cutter head has been shown in the aforementioned embodiment, the present invention is not restricted to this. According to the present invention, the detecting portions and the data recording portion may be arranged on the exposed outer surface (side surfaces, rear surfaces, or the like of the cutter spokes) of the cutter head that is subjected to water-proof treatment and vibration-proof treatment so far as the detecting portions and the data recording portion are arranged in the cutter head. Alternatively, the detecting portions may be mounted on disc cutter changers provided in the cutter spokes.

While the accelerometers that detect vibrations have been shown as the example of the detecting portion according to the present invention in the aforementioned embodiment, the present invention is not restricted to this. According to the present invention, as the detecting portion, acoustic sensors that detect sound waves may be employed, or both the accelerometers and the acoustic sensors may be employed.

While the example of converting the vibrations (signals) detected by the accelerometers (detecting portions) for post-event diagnosis from electrical digital signals to optical digital signals and transmitting the vibrations to the PC (internal information terminal device) of the control room has been shown in the aforementioned embodiment, the present invention is not restricted to this. According to the present invention, the signals detected by the detecting portions for post-event diagnosis may be directly transmitted as electrical digital signals to the internal information terminal device without being converted to optical digital signals. Also in this case, detection signals can be transmitted while not having a susceptibility to noise caused by a motor or the like that rotates the cutter head, as compared with the case where the detection signals are directly transmitted as analog signals.

While the example of providing one accelerometer (22) for real-time diagnosis and providing five accelerometers (21 and 23 to 26) for post-event diagnosis has been shown in the aforementioned embodiment, the present invention is not restricted to this. According to the present invention, all (six) of the accelerometers may be for real-time diagnosis, or a plurality of accelerometers for real-time diagnosis and a plurality of accelerometers for post-event diagnosis may be provided.

Figure 4:
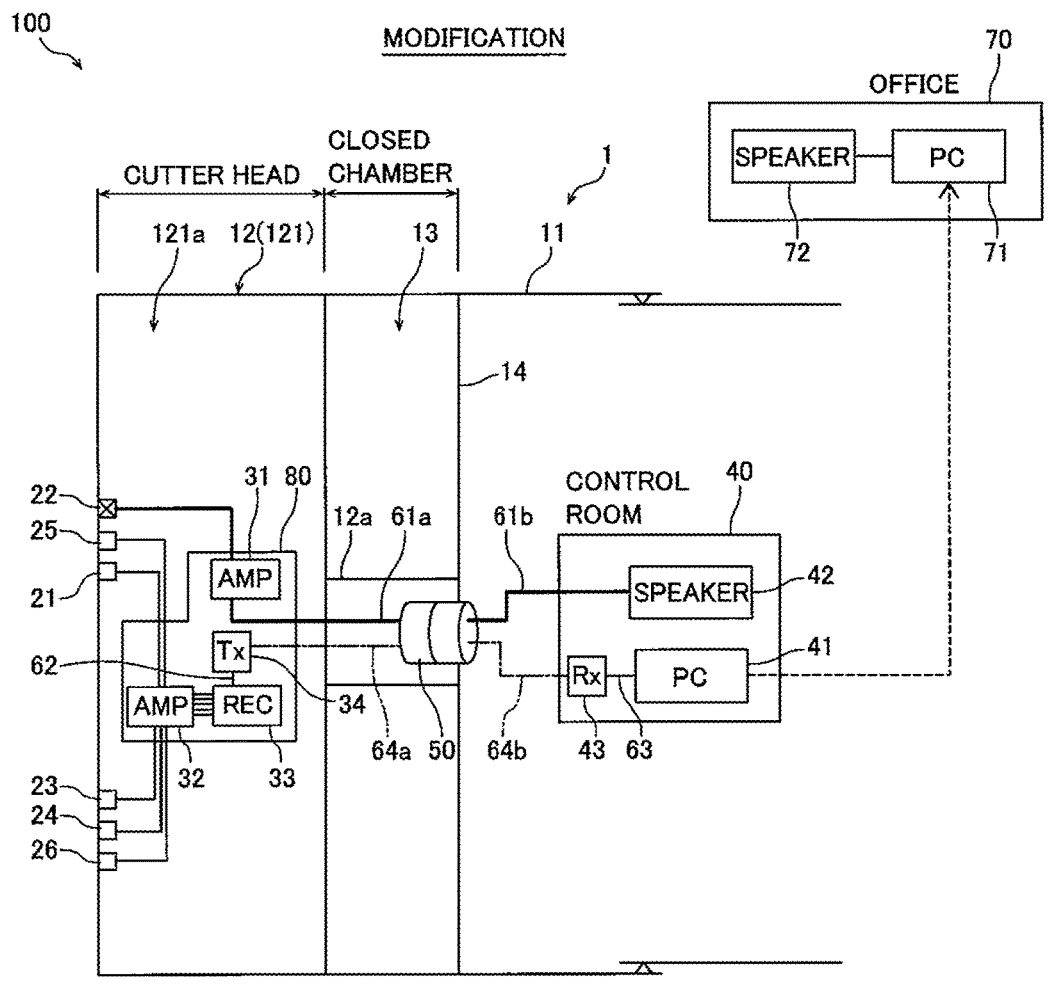
FIG. 4 A diagram showing a modification of the embodiment of the present invention.

While the example of outputting the signals detected by the accelerometers 21 and 23 to 26 (second detecting portions) for post-event diagnosis as sound by the speaker 42 (sound output portion) inside the tunneling machine has been shown in the aforementioned embodiment, the present invention is not restricted to this. According to the present invention, as in a modification shown in FIG. 4, signals detected by accelerometers 21 and 23 to 26 (second detecting portions) for post-event diagnosis may be output as sound by a speaker 72 (sound output portion) through a PC 71 (external information terminal device) outside (office 70 on the ground) a tunneling machine. In this case, only a signal detected by an accelerometer (22) for real-time diagnosis is output as sound in real time by a speaker 42 (sound output portion) inside the tunneling machine, and hence an operator (hearer) in the tunneling machine can be suppressed from being confused by a plurality of sound outputs, unlike the case where signals detected by a plurality of accelerometers are output as sound in real time by the speaker 42 (sound output portion).

While the example of arranging the speaker as the sound output portion according to the present invention inside the tunneling machine has been shown in the aforementioned embodiment, the present invention is not restricted to this. According to the present invention, the sound output portion may be arranged outside the tunneling machine.

REFERENCE NUMERALS

1: tunneling machine
12: cutter head
21, 23 to 26: accelerometer (detecting portion, second detecting portion for post-event diagnosis)
22: accelerometer (detecting portion, first detecting portion for real-time diagnosis)
33: recorder (data recording portion)
41: PC (internal information terminal device)
42, 72: speaker (sound output portion)
50: slip ring (signal transmission member)
71: PC (external information terminal device)
100: excavation status monitoring system for tunneling machine

The invention claimed is:

1. An excavation status monitoring system for a tunneling machine, comprising:
  a plurality of detecting portions including a first detecting portion and a plurality of second detecting portions, mounted on a cutter head of the tunneling machine, each of the plurality of detecting portions including an accelerometer that detects a vibration or an acoustic sensor that detects a sound wave;
  a data recording portion, arranged in the cutter head, capable of performing prescribed internal network communication, and unifying a plurality of signals detected by the plurality of the second detecting portions into a single signal;
  an internal information terminal device that is arranged in a portion of the tunneling machine behind the cutter head and receives the single signal transmitted through the internal network communication from the data recording portion; and a speaker that outputs a sound based on the single signal and based on a signal detected by the first detecting portion, wherein the cutter head in which the plurality of detecting portions and the data recording portion are arranged is rotary, the plurality of signals detected by the second detecting portions are transmitted to the speaker, involve the data recording portion and the internal information terminal device, and the single signal is output as sound, and the signal detected by the first detecting portion is transmitted to the speaker without involving the data recording portion and the internal information terminal device and is output as sound in real time.

2. The excavation status monitoring system for a tunneling machine according to claim 1, wherein the plurality of the detecting portions are arranged at different radial positions of the cutter head.

3. The excavation status monitoring system for a tunneling machine according to claim 2, wherein the plurality of detecting portions arranged at the different radial positions of the cutter head are arranged at different rotation angle positions of the cutter head.

4. The excavation status monitoring system for a tunneling machine according to claim 1, wherein the plurality of signals detected by the second detecting portions are recorded in the data recording portion, the single signal is transmitted through a signal transmission member that transmits a signal from a rotating body to a stationary body when the single signal is transmitted to the internal information terminal device through the internal network communication, and the single signal is electrical through the internal network communication and is converted to an optical signal for transmission to the internal information terminal device.

5. The excavation status monitoring system for a tunneling machine according to claim 1, further comprising an external information terminal device that is arranged outside the tunneling machine and receives the signals transmitted through external network communication by the internal information terminal device.

6. The excavation status monitoring system for a tunneling machine according to claim 1, wherein the single signal is transmitted to the speaker through the internal information terminal device and is output as sound after the plurality of signals detected by the second detecting portions are recorded in the data recording portion, and the sound is capable of being diagnosed by an external information terminal device on the basis of the plurality of signals detected by the second detecting portions recorded in the data recording portion.

* * * * *